United States Patent
Lee

(10) Patent No.: US 9,904,429 B2
(45) Date of Patent: Feb. 27, 2018

(54) TOUCH SCREEN PANEL

(71) Applicant: G2TOUCH Co., LTD, Seongnam (KR)

(72) Inventor: Sung Ho Lee, Hwaseong (KR)

(73) Assignee: G2TOUCH CO., LTD., Seongnam (KR)

( * ) Notice: Subject to any disclaimer, the term of this patent is extended or adjusted under 35 U.S.C. 154(b) by 9 days.

(21) Appl. No.: 15/286,361

(22) Filed: Oct. 5, 2016

(65) Prior Publication Data

US 2017/0097703 A1 Apr. 6, 2017

(30) Foreign Application Priority Data

Oct. 5, 2015 (KR) .................. 10-2015-0139645

(51) Int. Cl.
| | | |
|---|---|---|
| G06F 3/045 | (2006.01) | |
| G06F 3/044 | (2006.01) | |
| G06F 3/041 | (2006.01) | |
| G06F 3/046 | (2006.01) | |

(52) U.S. Cl.
CPC ............ *G06F 3/044* (2013.01); *G06F 3/0418* (2013.01); *G06F 3/045* (2013.01); *G06F 3/046* (2013.01); *G06F 3/0412* (2013.01); *G06F 3/0416* (2013.01)

(58) Field of Classification Search
CPC ........ G06F 3/044; G06F 3/045; G06F 3/0412; G06F 3/0416; G06F 3/046
See application file for complete search history.

(56) References Cited

U.S. PATENT DOCUMENTS

| | | | | |
|---|---|---|---|---|
| 7,369,123 B2* | 5/2008 | Ohtake | ................. | G06F 1/1618 345/173 |
| 7,663,607 B2* | 2/2010 | Hotelling | .............. | G06F 3/0416 178/18.01 |
| 8,614,680 B2* | 12/2013 | Lin | ......................... | G06F 3/044 257/666 |
| 8,638,313 B2* | 1/2014 | Kinoshita | ............... | G06F 3/044 345/174 |
| 9,146,412 B2* | 9/2015 | Abe | ...................... | G06F 3/0418 |
| 9,280,014 B2* | 3/2016 | Du | ....................... | G02F 1/13338 |
| 9,442,599 B2* | 9/2016 | Lyle | ........................ | G06F 3/044 |
| 9,465,462 B2* | 10/2016 | Jeong | ...................... | G06F 3/041 |
| 9,491,852 B2* | 11/2016 | Lyon | ..................... | G06F 3/0412 |
| 9,563,320 B2* | 2/2017 | Lee | ........................ | G01L 1/2206 |
| 9,639,216 B2* | 5/2017 | Lu | ............................ | G06F 3/044 |
| 9,647,658 B2* | 5/2017 | Yilmaz | .............. | H03K 17/9622 |
| 9,671,639 B2* | 6/2017 | Abe | .................... | G02F 1/13338 |

(Continued)

FOREIGN PATENT DOCUMENTS

TW 201145101 A 12/2011
TW M504280 U 7/2015

*Primary Examiner* — Michael J Jansen, II

(57) ABSTRACT

Disclosed herein is a touch screen panel detecting a capacitive touch input applied by a finger or a touch input means having conductivity like the finger. According to the present invention, the touch screen panel includes: a touch pad forming touch electrostatic capacity (Ct) between the touch pad and the touch input means; and a sensor signal line connecting the touch pad and a touch integrated circuit (IC) to transmit a Ct signal changed on the touch pad to the touch IC, wherein when a resistance value varying with a distance between the touch pad and the touch IC is lower than or equal to a set value, the sensor signal line forms a resistance compensation pattern compensating for the resistance value.

14 Claims, 11 Drawing Sheets

(56) References Cited

U.S. PATENT DOCUMENTS

| | | | | |
|---|---|---|---|---|
| 9,727,196 B2* | 8/2017 | Tada | .................... | H05K 1/0289 |
| 9,798,406 B2* | 10/2017 | Lo | .......................... | G06F 3/0412 |
| 2008/0252608 A1* | 10/2008 | Geaghan | ................. | G06F 3/044 |
| | | | | 345/173 |
| 2009/0184946 A1* | 7/2009 | Ahn | ................... | G02F 1/133512 |
| | | | | 345/206 |
| 2010/0066709 A1* | 3/2010 | Yajima | ................... | H05K 1/117 |
| | | | | 345/204 |
| 2011/0062971 A1* | 3/2011 | Badaye | .................. | G06F 3/044 |
| | | | | 324/686 |
| 2011/0210934 A1* | 9/2011 | Lee | ......................... | G06F 3/044 |
| | | | | 345/173 |
| 2012/0092273 A1* | 4/2012 | Lyon | ..................... | G06F 3/0412 |
| | | | | 345/173 |
| 2012/0206402 A1* | 8/2012 | Park | ........................ | G06F 3/044 |
| | | | | 345/174 |
| 2013/0088443 A1* | 4/2013 | Min | ........................ | G06F 3/044 |
| | | | | 345/173 |
| 2013/0154979 A1* | 6/2013 | Li | .......................... | G06F 3/041 |
| | | | | 345/173 |
| 2013/0293791 A1* | 11/2013 | Abe | ....................... | G06F 3/0418 |
| | | | | 349/12 |
| 2014/0198267 A1* | 7/2014 | Jeong | ....................... | G06F 3/041 |
| | | | | 349/12 |
| 2014/0285728 A1* | 9/2014 | Lee | ......................... | G06F 3/041 |
| | | | | 349/12 |
| 2016/0054846 A1* | 2/2016 | Lee | ....................... | G06F 3/0416 |
| | | | | 345/174 |
| 2016/0062527 A1* | 3/2016 | Lee | ....................... | G06F 3/0412 |
| | | | | 345/173 |
| 2016/0202833 A1* | 7/2016 | Kim | ....................... | G06F 3/0416 |
| | | | | 345/173 |
| 2016/0291754 A1* | 10/2016 | Jin | ........................ | G06F 3/0412 |
| 2016/0313860 A1* | 10/2016 | Ono | ....................... | G06F 3/0418 |
| 2016/0334910 A1* | 11/2016 | Ono | ....................... | G06F 3/0412 |
| 2017/0010714 A1* | 1/2017 | Lee | ....................... | G06F 3/0416 |
| 2017/0010715 A1* | 1/2017 | Lee | ......................... | G06F 3/044 |
| 2017/0045971 A1* | 2/2017 | Lee | ......................... | G06F 3/041 |
| 2017/0097703 A1* | 4/2017 | Lee | ....................... | G06F 3/0418 |
| 2017/0097727 A1* | 4/2017 | Wu | ....................... | G06F 3/0416 |

\* cited by examiner

【FIG 1】
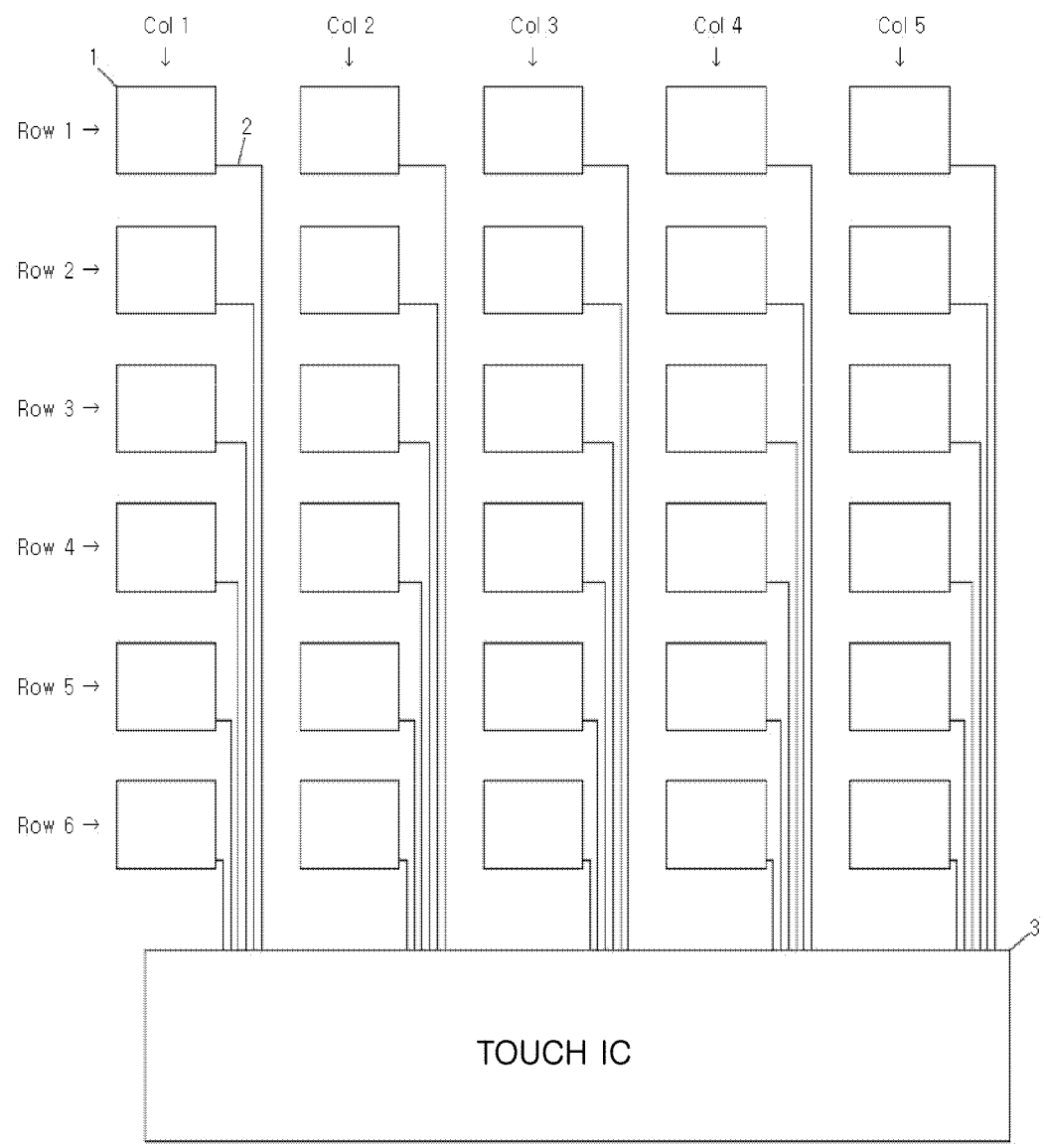

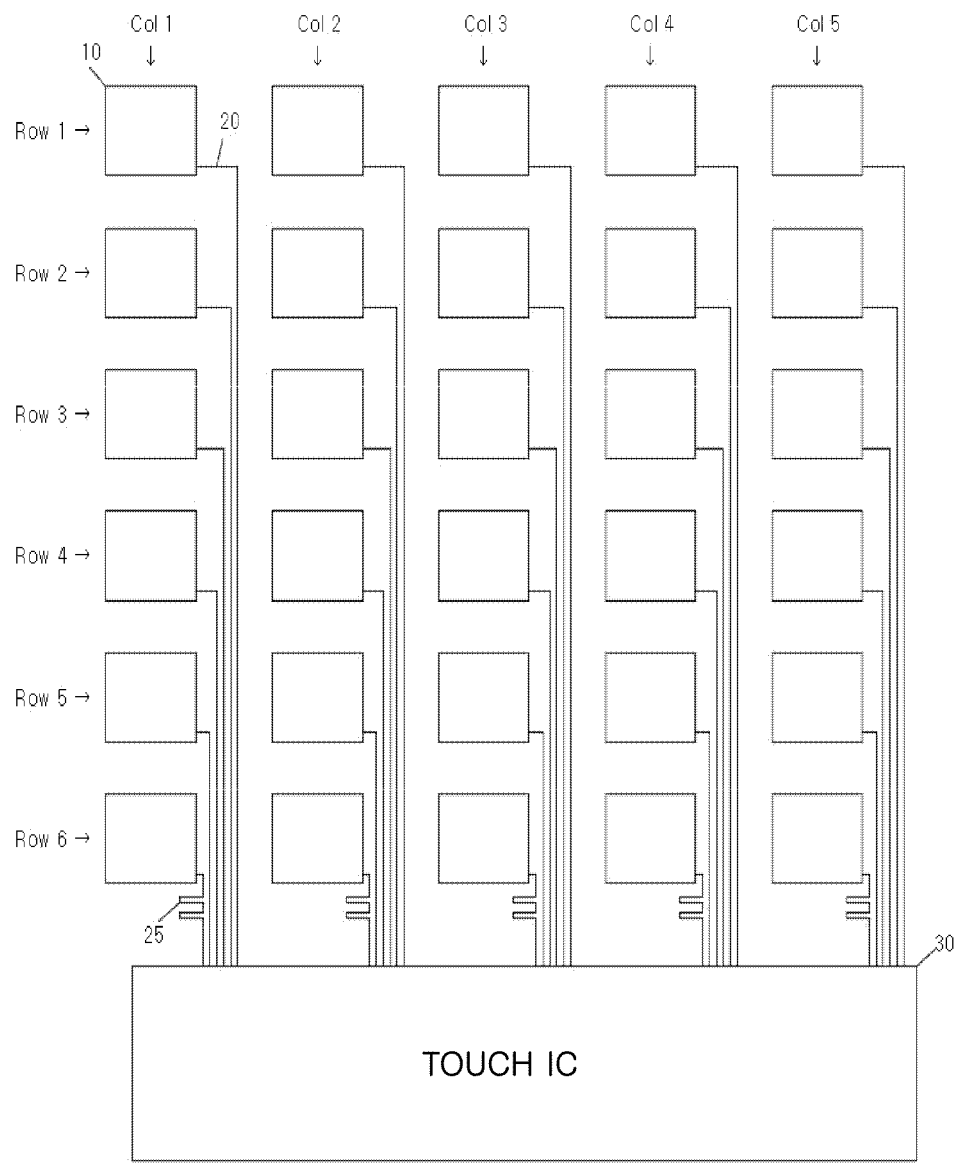
[FIG 2]

[FIG 4]
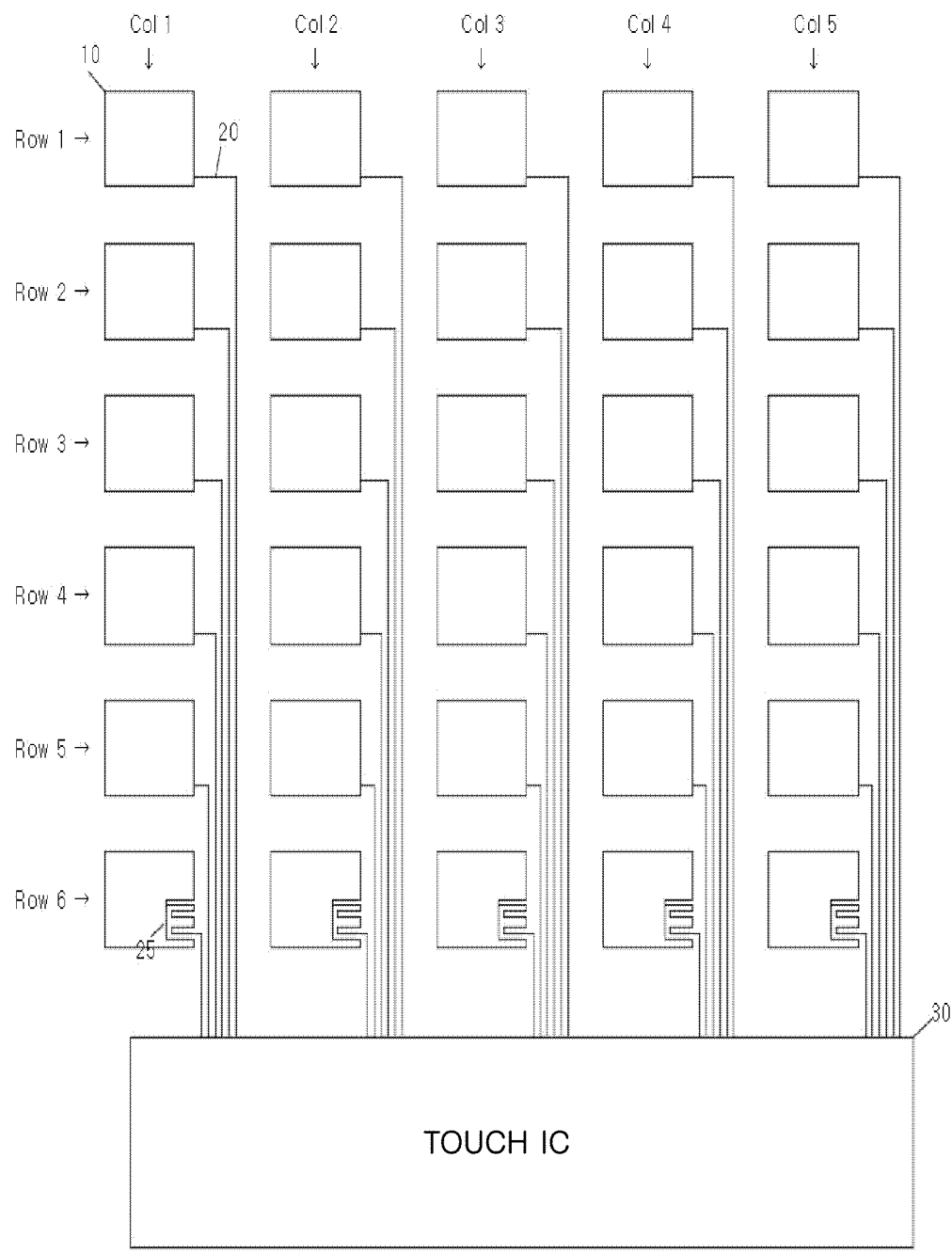

[FIG 5]
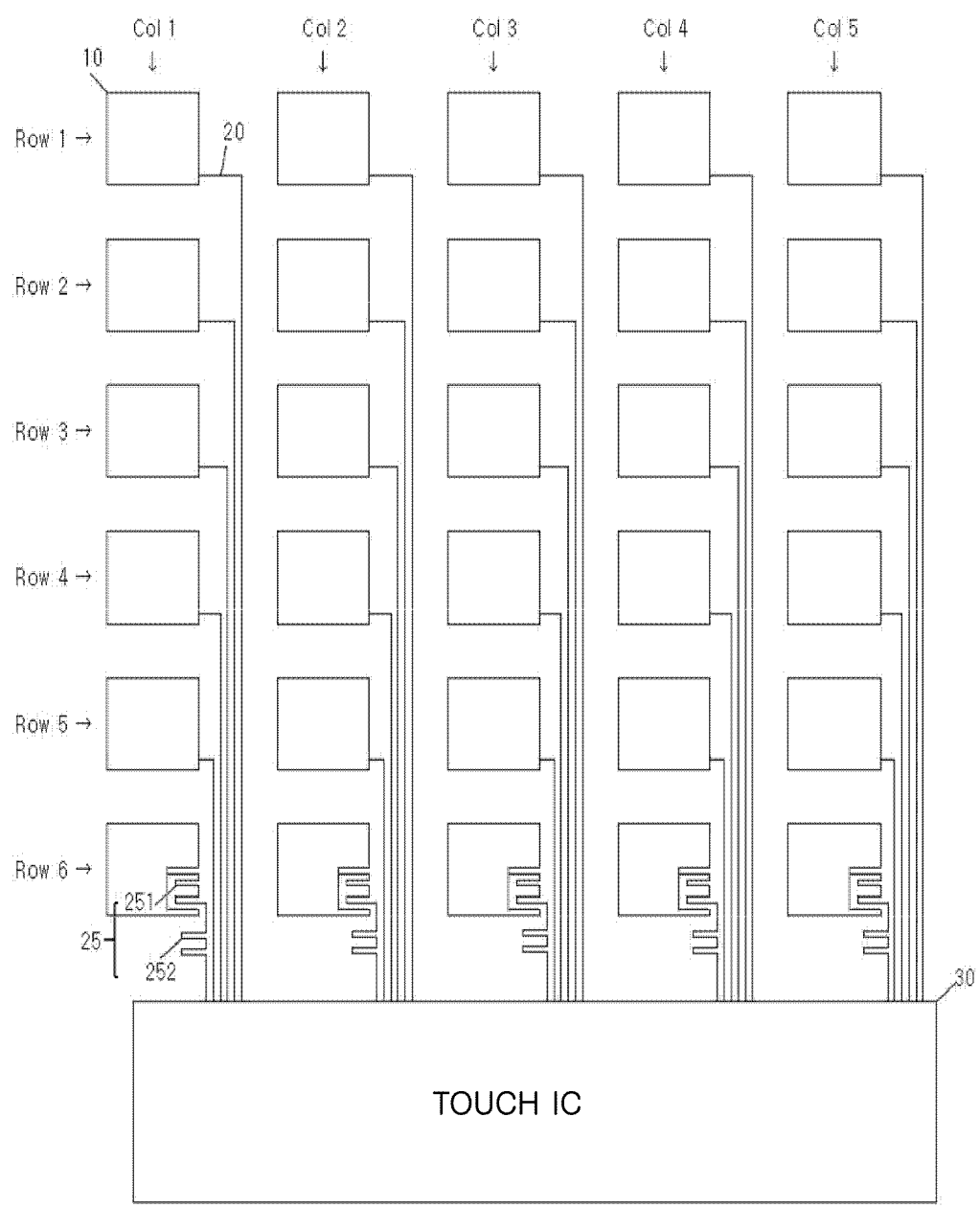

[FIG 6]
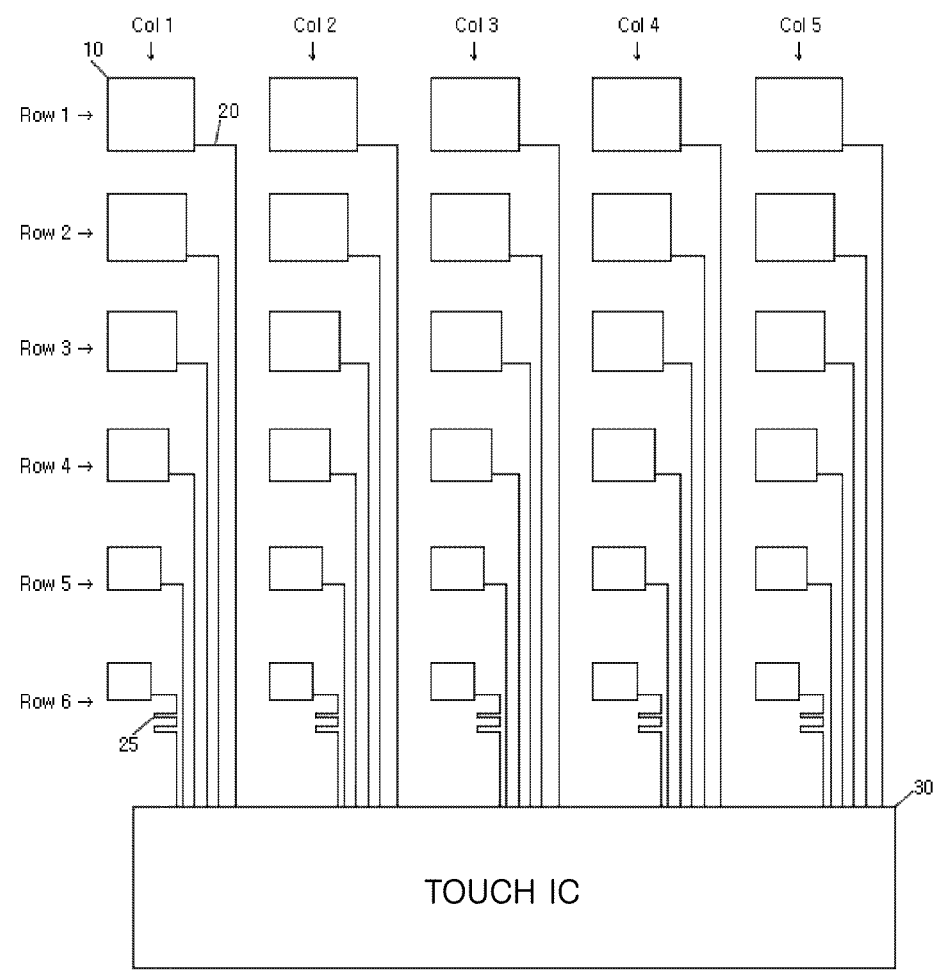

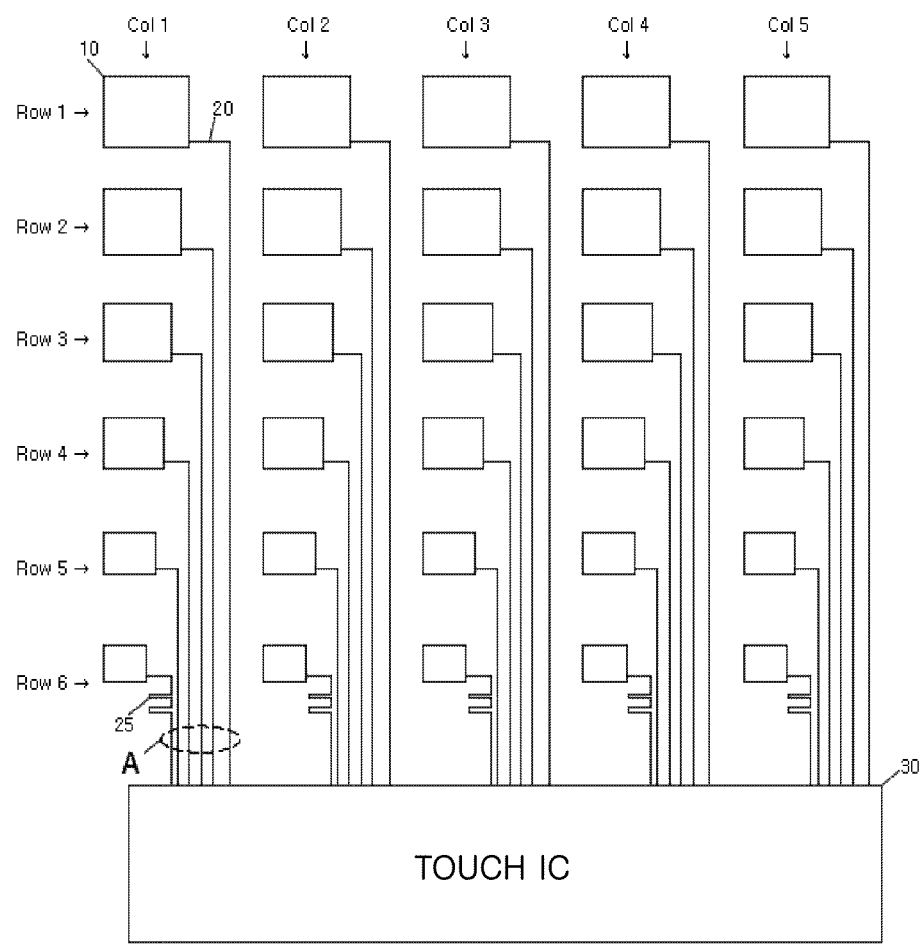
[FIG 7A]

[FIG 7B]
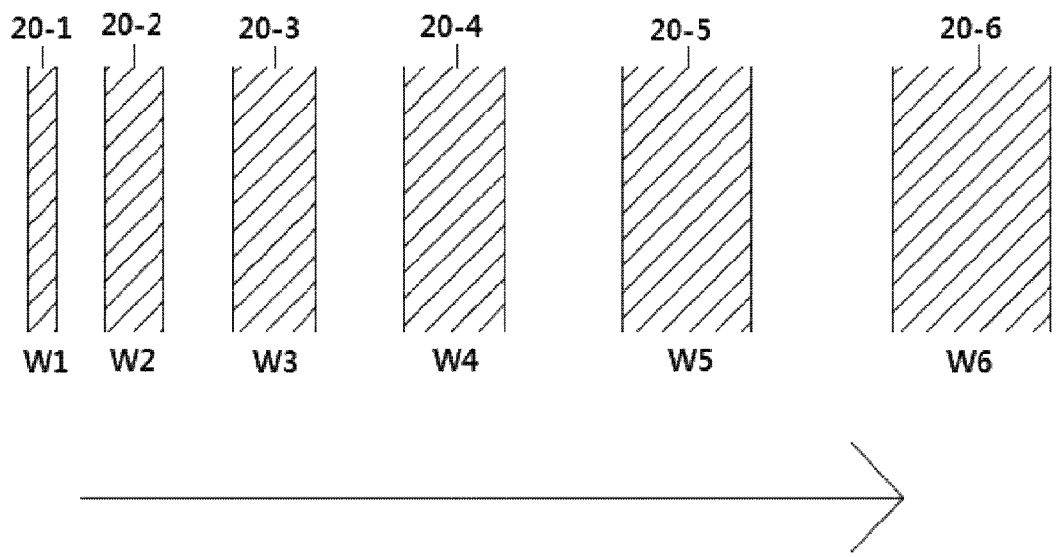

[FIG 7C]
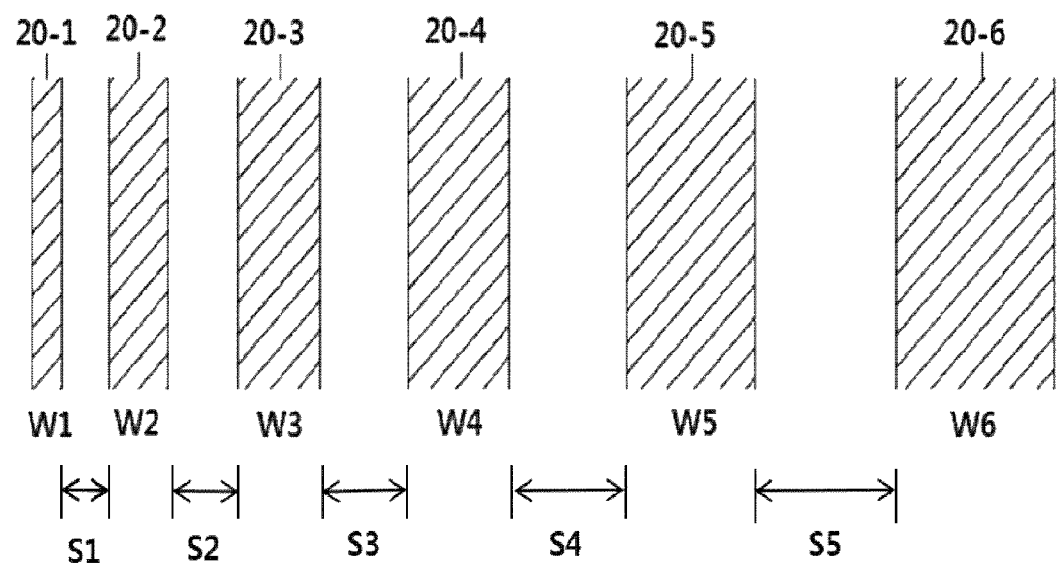

[FIG 8]
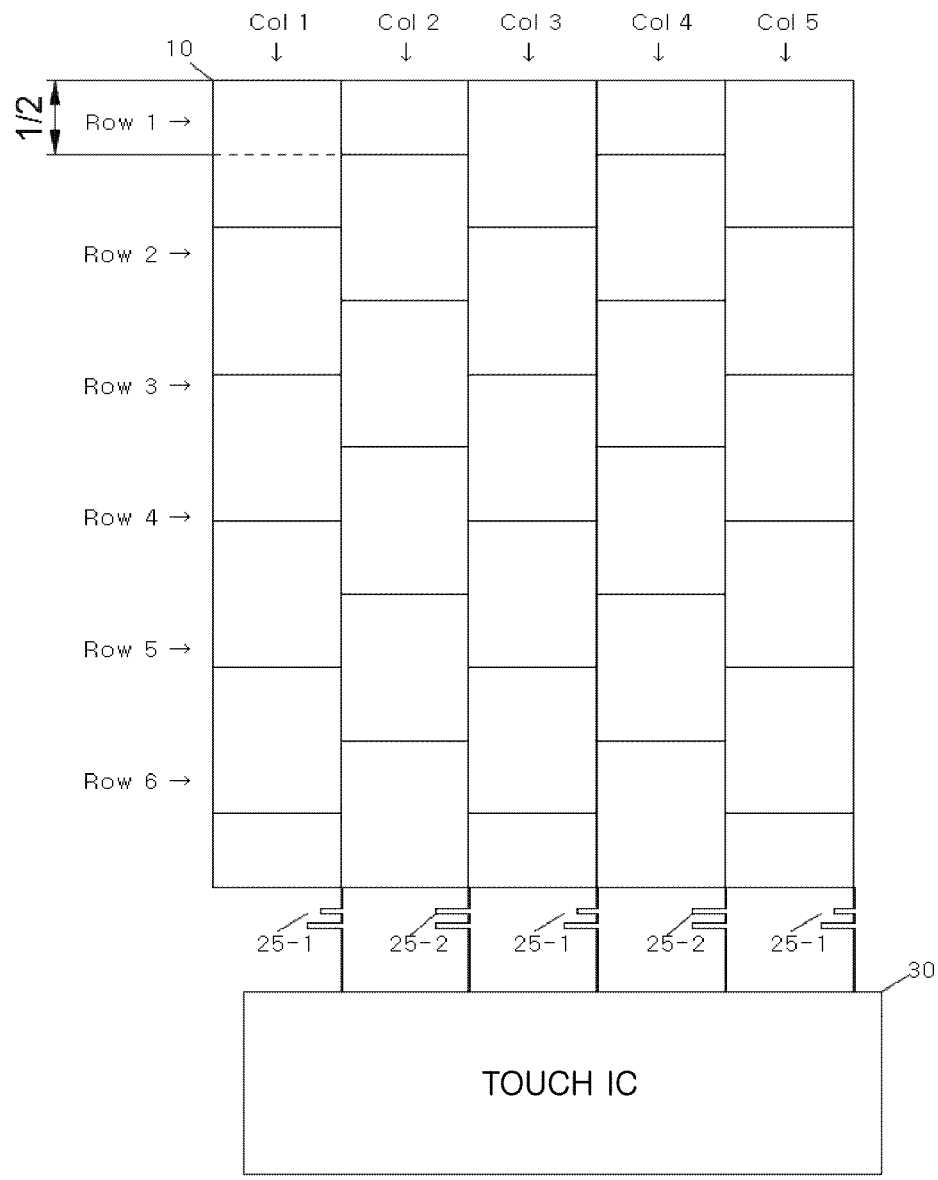

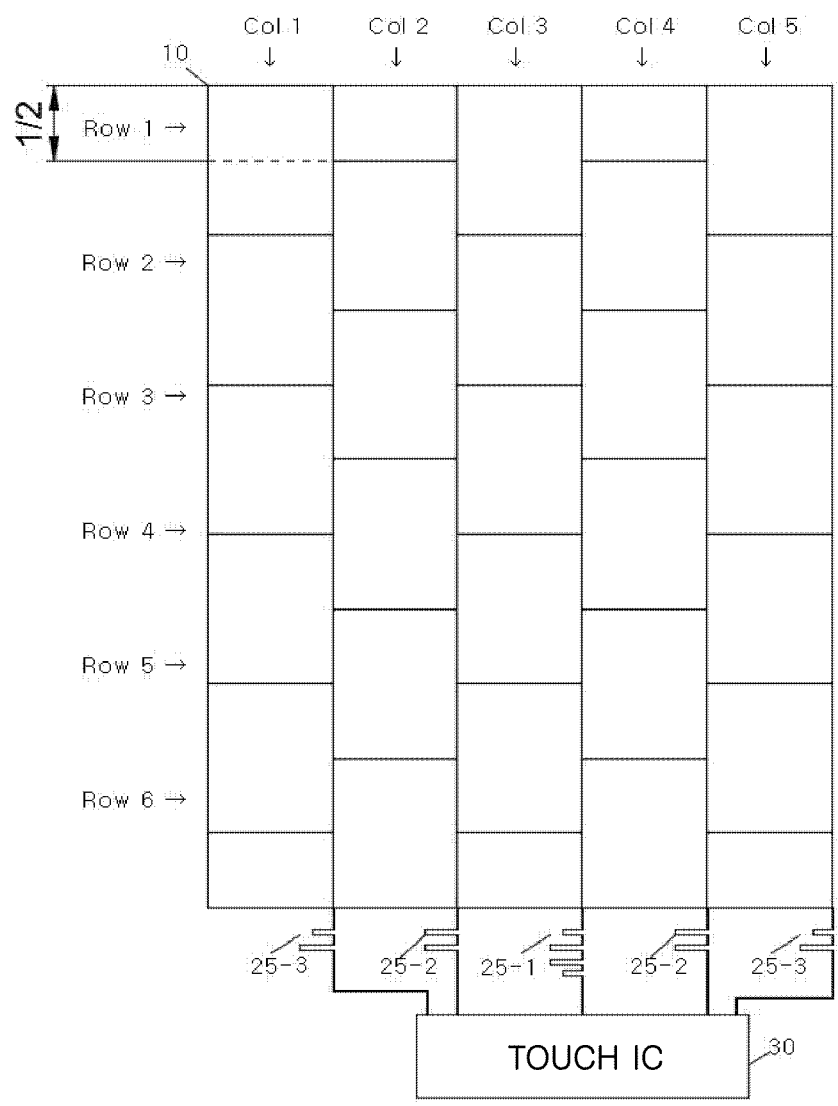

TOUCH SCREEN PANEL

CROSS-REFERENCE TO RELATED APPLICATIONS

This application claims priority from and the benefit of Korean Patent Application No. 10-2015-0139645, filed on Oct. 5, 2015, which is hereby incorporated by reference for all purposes as if fully set forth herein.

BACKGROUND OF THE INVENTION

Field of the Invention

The present invention relates to a touch screen panel detecting a capacitive touch input applied by a finger or a touch input means having conductivity similar to the finger, and more particularly, to a touch screen panel having a structure capable of preventing the touch screen panel from being damaged due to electrostatic discharge (ESD) or overvoltage.

Discussion of the Background

Generally, a touch screen panel is formed in or coupled to display devices such as a liquid crystal display (LCD), a plasma display panel (PDP), an organic light emitting diode (OLED), and an active matrix organic light emitting diode (AMOLED) and is one of the input devices that generate position signals corresponding to positions where objects such as a finger and a pen are touched. The touch screen panel has been used in wide applications such as small portable terminals, industrial terminals, and digital information devices and the use field thereof is expanding.

A capacitive touch screen panel is a device for determining whether the touch screen panel is touched based on a change of an electrical signal formed by capacitance that is generated between a finger or a touch input tool having conductivity like the finger and a touch pattern of the touch screen panel.

According to the existing touch screen panel as disclosed in Korean Patent Publication No. 10-374312 (Jun. 14, 2014), touch pads formed with a touch patterns have a matrix structure (FIG. 1) in which a plurality of columns and rows are disposed and one side of the touch screen panel is provided with a touch integrated circuit (IC), and the respective touch pads are connected to the touch IC through sensor signal lines.

The existing touch screen panel includes a plurality of touch pads that are included in columns or rows. Here, a resistance value varies with a distance between the respective touch pads and the touch IC, even in the sensor signal lines connecting between the same columns or the same rows.

At this point, the sensor signal line connected to the touch pad that is close to the touch IC has a lower resistance value than the sensor signal line connected to the touch pad that is far from the touch IC, and therefore the touch pad that is close to the touch IC may be damaged due to the electrostatic discharge (ESD) introduced into the touch screen panel or the overvoltage generated from the touch IC.

RELATED ART DOCUMENT

Patent Document (Patent Document 0001) Korean Patent Publication No. 10-1374312 (Jun. 14, 2014)

SUMMARY OF THE INVENTION

An object of the present invention is to provide a touch screen panel formed with a resistance compensation pattern compensating for a low resistance value of sensor signal lines connecting between a plurality of touch pads and a touch IC that are disposed in the touch screen panel.

Another object of the present invention is to make a width of sensor signal lines different to change a resistance value according to a distance between a plurality of touch pads and a touch IC, in reference to the plurality of touch pads that are disposed in the same columns or the same rows.

Still another object of the present invention is to compensate for a resistance value within a limited space by forming a resistance compensation pattern in a meander shape.

Still yet another object of the present invention is to separately secure a region, in which a resistance compensation pattern is formed, in a region of a touch screen panel or form the resistance compensation pattern in an internal region of a touch pad not to adjust a size of the touch pad for forming the resistance compensation pattern.

According to an exemplary embodiment of the present invention, there is provided a touch screen panel including: a touch pad forming touch electrostatic capacity (Ct) between the touch pad and the touch input means; and a sensor signal line connecting the touch pad and a touch integrated circuit (IC) to transmit a Ct signal changed on the touch pad to the touch IC, wherein when a resistance value varying with a distance between the touch pad and the touch IC is lower than or equal to a set value, the sensor signal line forms a resistance compensation pattern compensating for the resistance value.

As the resistance value to be compensated based on the set value of the sensor signal line is increased, a length of the resistance compensation pattern may be getting longer.

The sensor signal line may have a different width according to a distance between the touch pad and the touch IC.

The resistance compensation pattern may have a meander shape.

The resistance compensation pattern may be formed inside the touch pad.

The resistance compensation pattern may prevent electrostatic discharge (ESD) introduced into the touch screen panel or overvoltage.

BRIEF DESCRIPTION OF THE DRAWINGS

FIG. 1 is a diagram illustrating a configuration of the existing matrix type touch screen panel.

FIG. 2 is a diagram illustrating a touch screen panel according to a first embodiment of the present invention.

FIG. 4 is a diagram illustrating a touch screen panel according to a second embodiment of the present invention.

FIG. 5 is a diagram illustrating a touch screen panel according to a third embodiment of the present invention.

FIG. 6 is a diagram illustrating a touch screen panel according to a fourth embodiment of the present invention.

FIG. 7A is a diagram illustrating a touch screen panel according to a fifth embodiment of the present invention.

FIG. 7B is an enlarged view of region A, in the touch screen panel according to the fifth embodiment of the present invention.

FIG. 7C is a diagram illustrating a distance between sensor signal lines, in the touch screen panel according to the fifth embodiment of the present invention.

FIG. 8 is a diagram illustrating a touch screen panel according to a sixth embodiment of the present invention.

FIG. 9 is a diagram illustrating a touch screen panel according to a seventh embodiment of the present invention.

DETAILED DESCRIPTION OF THE ILLUSTRATED EMBODIMENTS

Figures 3A, 3B, 3C:
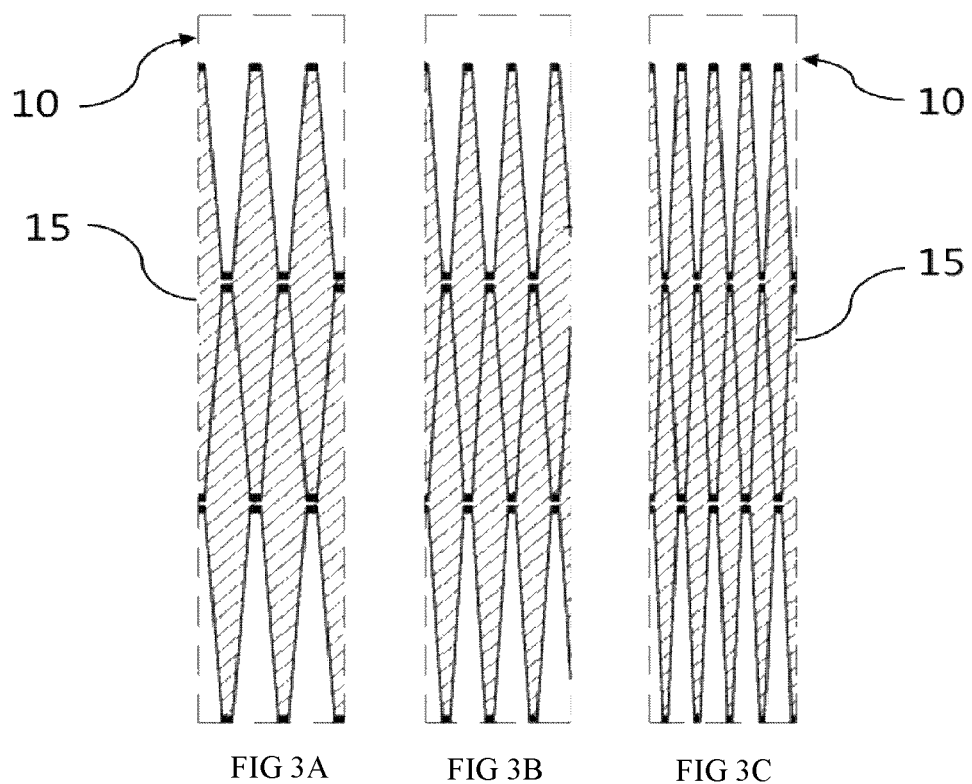
FIGS. 3A, 3B and 3C are diagrams respectively illustrating a first, a second and a third embodiments of a touch pattern formed on a touch pad, in a touch screen panel according to the present invention.

In order to sufficiently understand operational advantages of the present invention and objects accomplished by embodiments of the present invention, the accompanying drawings showing embodiments of the present invention and contents described in the accompanying drawings should be referred.

Hereinafter, embodiments of the present invention will be described in detail with reference to the accompanying drawings. Like reference numerals proposed in each drawing denote like elements.

In the present invention, a touch screen panel denotes a capacitive touch screen panel. The touch screen panel means a device for determining whether the touch screen panel is touched based on a change of an electrical signal (e.g., voltage, etc.) formed by capacitance that is generated between a finger or a touch input tool having conductivity like the finger and a touch pattern of the touch screen panel.

In the present invention, the touch pad is made of a conductive material and may be denoted as a touch electrode.

FIG. 2 is a diagram illustrating a touch screen panel according to a first embodiment of the present invention. The touch screen panel according to the embodiment of the present invention senses an approach of a touch input means, including finger or a touch by the touch input means and is configured to largely include a touch pad 10, a sensor signal line 20, and a touch integrated circuit (IC) 30.

The touch pad 10 forms a touch electrostatic capacity Ct between the touch pad 10 and the touch input means. As illustrated in FIG. 2, the touch pad 10 may have a matrix form in which the touch pad 10 is continuously disposed vertically on the touch screen panel to form one column that is disposed in a plurality of columns or the touch pad 10 is continuously disposed horizontally on the touch screen panel to form one row that is disposed in a plurality of rows.

Further, the touch pads 10 that are formed in adjacent columns or adjacent rows may also be formed to intersect each other, having a predetermined distance offset.

The touch pad 10 is formed by repeatedly patterning a transparent conductive material in a plurality of fine patterns. According to the present invention, the transparent conductive material may include any one of ITO, CNT, ATO, IZO, metal mesh, and silver nano wire.

According to the embodiment of the present invention, as illustrated in FIGS. 3A, 3B, and 3C, the touch pad 10 includes a touch pattern in a state in which diamond-shaped basic touch patterns are disposed in a row.

The diamond-shaped basic patterns configuring the respective touch patterns 15 may be variously adjusted according to a usage or a size of the touch screen panel. One column of the touch screen panel is formed by repeatedly disposing the shape in which the basic touch patterns are vertically coupled with each other in the state in which a phase of a pair of touch patterns 15 is inverted to each other by 180°.

The respective touch patterns 15 generate the touch electrostatic capacity Ct by an approach of the touch means or a touch by the touch means, in which the touch electrostatic capacity Ct ranges from several femto Farad (Ff) to tens of micro Farad (µF).

The sensor signal line 20 connects between the touch pad 10 and the touch IC 30 to transfer a signal of the touch electrostatic capacity Ct varying on the touch pad 10 to the touch IC 30 and is formed by repeatedly patterning a transparent conductive material in a plurality of fine patterns like the touch pad 10.

According to the present invention, when a resistance value varying with a distance between the touch pad 10 and the touch IC 30 is lower than or equal to a set value, the sensor signal line 20 forms a resistance compensation pattern 25 compensating for the resistance value.

According to the present invention, a resistance value R of the sensor signal line 20 is calculated by the following [Equation 1].

$$R = \rho \frac{l}{w} \quad \text{[Equation 1]}$$

In the above Equation 1, ρ represents a specific resistance size of the transparent conductive material used for the sensor signal line, for example, ITO, or the like, w represents a wiring width of the sensor signal line, and l represents a length of the sensor signal line.

It may be confirmed by the above [Equation 1] that the resistance value R of the sensor signal line 20 is proportional to the length l of the sensor signal line 20 and is inversely proportional to the wiring width w of the sensor signal line 20.

That is, if the plurality of touch pads 10 are disposed on the touch screen panel, the length of the sensor signal line 20 is determined according to the distance between the respective touch pads 10 and the touch IC 30. The longer the length of the sensor signal line 20, the larger the size of the resistance value R and the shorter the length of the sensor signal line 20, the smaller the size of the resistance value R.

According to the first embodiment of the present invention illustrated in FIG. 2, a sensor signal line 20 connecting between the touch pad 10 positioned at a bottom of a column, that is, Row 6 and the touch IC 30 is formed to have a lower resistance value R than the sensor signal line 20 connecting between the touch pad 10 positioned at a top of the respective columns, that is, Row 1 and the touch IC 30.

In this case, when the resistance value R of the sensor signal line 20 is low, the touch pad 10 connected to the sensor signal line 20 may be damaged due to the electrostatic discharge (ESD) introduced from the outside of the touch screen panel or overvoltage generated from the touch IC 30.

Accordingly, in the present invention, the resistance compensation pattern 25 compensating for the low resistance value is formed in the sensor signal line 20 connecting between the touch pad 10 and the touch IC 30 like the Row 6.

When the resistance value of the sensor signal line 20 varying with a distance between the touch pad 10 and the touch IC 30 is lower than or equal to a set value, the resistance compensation pattern 25 compensates for the resistance value to make the resistance value large, thereby coping with the electrostatic discharge introduced from the outside of the touch screen panel or the overvoltage generated from the touch IC to protect the sensor signal line 20 from being disconnected.

According to the present invention, the larger the resistance value to be compensated by the resistance compensation pattern 25 based on the set value, the length of the resistance compensation pattern is getting longer. According to the embodiment of the present invention, the resistance compensation pattern 25 is formed at a position adjacent to the touch IC 30 in a meander shape.

The meander-shaped resistance compensation pattern 25 may effectively increase the length of the sensor signal line 20 within a limited space, as the size of the resistance value R to be compensated is large and the length of the resistance compensation pattern 25 is long, the number of bent portions of the meander may be increased, and a distance between the bent portions of the meander and a spacing between adjacent lines may also be adjusted variously depending on a space in which the resistance compensation pattern 25 is formed.

Further, the resistance compensation pattern 25 according to the present invention may be formed to have the meander shape even in the space region generated due to the spacing between the sensor signal lines 20 and when the resistance compensation patterns 25 are formed in each of the adjacent sensor signal lines 20, the plurality of resistance compensation patterns 25 may also be formed within the spacing between the respective sensor signal lines 20.

FIG. 4 illustrates a touch screen panel according to a second embodiment of the present invention, in which the resistance compensation pattern 25 is formed in the internal region of the touch pad 10.

Like the second embodiment, when the resistance compensation pattern 25 is formed in the touch pad 10 positioned at the bottom of the column, that is, the Row 6, the resistance compensation pattern 25 is formed in the touch pattern 15 in the meander shape. By doing so, the region in which the resistance compensation pattern 25 is formed need not be separately secured and the size of the touch pad need not be adjusted to form the resistance compensation pattern.

Further, when the resistance compensation pattern 25 according to the present invention is formed in the touch pad 10, the internal space or the external space of the region in which the touch pattern 15 is formed may be used and the meander shape may be variously formed according to the size of the space in which the resistance compensation pattern 25 is formed.

According to the first and second embodiments of the present invention, the resistance compensation pattern 25 is formed only in the sensor signal line 20 connected to the Row 6, but the resistance compensation pattern 25 may be formed in at least one of the plurality of sensor signal lines 20 connected to the same column depending on the set resistance value without being limited thereto.

FIG. 5 illustrates a touch screen panel according to a third embodiment of the present invention, in which the resistance compensation pattern 25 includes an internal resistance compensation pattern 251 formed inside the touch pad and an external resistance compensation pattern 252 formed outside the touch pad 10.

According to the third embodiment of the present invention, the resistance compensation pattern 25 is formed inside and outside the touch pad 10, thereby maximizing the length of the resistance compensation pattern 25 within the limited space and the resistance compensation pattern 25 may be variously formed by a combination of the internal resistance compensation pattern 251 and the external resistance compensation pattern 252.

FIG. 6 is a touch screen panel according to a fourth embodiment of the present invention, in which the plurality of touch pads 10 disposed in each column are formed to have a size reduced from the upper portion of the touch IC 30 toward the lower portion thereof and the resistance compensation patterns 25 are formed in the sensor signal lines 20 connected to all the touch pads 10 positioned at the Row 6.

According to the third and fourth embodiments of the present invention, the resistance compensation pattern 25 is formed only in the sensor signal line 20 connected to the Row 6, but the resistance compensation pattern 25 may be formed in at least one of the plurality of sensor signal lines 20 connected to the same column depending on the set resistance value without being limited thereto.

According to the present invention, the reason of making the size of the touch pads 10 disposed in each column different is as follows.

When a finger is close to each touch pad 10 by distance d, the touch electrostatic capacity Ct is formed in proportion to permittivity e of a material between the finger and the touch pad 10. The touch electrostatic capacity Ct is proportional to an opposing area A of the finger and the sensor pattern like the following [Equation 2].

$$C=(eA)/d \qquad \text{[Equation 2]}$$

Further, in connection with the touch electrostatic capacity Ct, a voltage V is proportional to a charge quantity like the following [Equation 3]. In this case, the rising of the voltage is delayed due to the resistance value of the sensor signal line 20 and the larger the resistance value, the longer the delayed time.

$$V=Q/C \qquad \text{[Equation 3]}$$

That is, there is a difference between an increment of voltage passing through the sensor signal line (sensor signal line connected to the touch pad 10 positioned at the Row 6) having a low resistance value and an increment of voltage passing through the sensor signal line (sensor signal line connected to the touch pad 10 positioned at the Row 1) having a large resistance value, at the equal time and therefore there is a difference in detection voltage depending on the touch electrostatic capacity Ct formed by the same touch area. Consequently, this acts as an error in touch coordinate calculation at the time of detecting a multi touch.

Therefore, in the touch screen panel according to the fourth embodiment of the present invention, the plurality of touch pads 10 disposed in each column are formed to have a size reduced from the upper portion of the touch IC 30 toward the lower portion thereof, thereby improving the detection accuracy of the multi touch.

Further, if the plurality of touch pads 10 are disposed in one column, the number of sensor signal lines 20 is increased toward the lower portion of the touch IC 30, and therefore the disposition space of the sensor signal line 20 may be insufficient in the region adjacent to the touch IC 30.

Therefore, like the fourth embodiment of the present invention, the plurality of touch pads 10 disposed in each column are formed to have an area size reduced from the upper portion of the touch IC 30 toward the lower portion thereof, and therefore the disposition space of the sensor signal line 20 is easily secured, thereby easily securing the forming space of the resistance compensation pattern 25.

FIG. 7A illustrates a touch screen panel according to a fifth embodiment of the present invention, in which the plurality of touch pads 10 disposed in each column are formed to have a size reduced from the upper portion of the touch IC 30 toward the lower portion thereof and the resistance compensation patterns 25 are formed in the sensor signal lines 20 connected to all the touch pads 10 at the sixth row Row 6. As illustrated in FIG. 7B, the longer the connection length between the touch pad 10 and the touch IC 30, the larger the wiring width of the sensor signal line 20.

That is, a first sensor signal line 20-1 to a sixth sensor signal line 20-6 disposed in the same first column Col 1 have the wiring width (W1<W2<W3<W4<W5<W6) increased from the first sensor signal line 20-1 toward the sixth sensor signal line 20-6.

As can be appreciated from the above [Equation 1], the resistance value R of the sensor signal line 20 is inversely proportional to the wiring width w, and therefore the wiring width w is formed to be different according to the distance between the touch pad 10 and the touch IC 30, thereby effectively changing the resistance value R of the sensor signal line 20 along with the resistance compensation pattern 25.

Further, FIG. 7C illustrates a spacing S between the sensor signal lines 20 in the touch screen panel according to the fifth embodiment of the present invention. According to the present invention, the spacing S between the sensor signal lines 20 is changed according to the wiring width w of the sensor signal line having the wider wiring width w of the two sensor signal lines.

That is, in the fifth embodiment of the present invention, the first sensor signal line 20-1 to the sixth sensor signal line 20-6 disposed in the same first column Col 1 have the wiring width (W1<W2<W3<W4<W5<W6) increased from the first sensor signal line 20-1 toward the sixth sensor signal line 20-6, and the spacing S between the respective sensor signal lines is also increased from the first sensor signal line 20-1 toward the sixth sensor signal line 20-6.

Describing in more detail, a parasitic capacitance Cp is generated between the sensor signal line 20 adjacent to the sensor signal line 20 connected to the touch pad 10 that is far from the touch IC 30. Depending on the above [Equation 2], the parasitic capacitance Cp between the sensor signal lines 20 is inversely proportional to an opposing distance d and is proportional to an opposing area A, and therefore the narrower the opposing distance between the sensor signal lines 20 and the longer the opposing length, the larger the size of the parasitic capacitance Cp.

Therefore, in the case of the sensor signal line 20 connected to the touch pad 10 that is far from the touch IC 30, the size of the parasitic capacitance Cp is increased. To reduce the size of the parasitic capacitance Cp, in the case of the sensor signal line 20 connected to the touch pad 10 that is far from the touch IC 30, that is, the sensor signal line 20 having a wider wiring width w, the spacing between the adjacent sensor signal lines 20 needs to be wide.

According to the fifth embodiment of the present invention, a wiring width W2 of a second sensor signal line 20-2 of the first sensor signal line 20-1 and the second sensor signal line 20-2 is larger, and therefore a first spacing S1 that is a spacing between the first sensor signal line 20-1 and the second sensor signal line 20-2 is determined by the second wiring width W2.

Further, a wiring width W3 of the third sensor signal line 20-3 of the second sensor signal line 20-2 and the third sensor signal line 20-3 adjacent to each other is larger, and therefore a second spacing S2 that is a spacing between the second sensor signal line 20-2 and the third sensor signal line 20-3 is determined by the third wiring width W3. Consequently, the spacing between the sensor signal lines 20 is increased as the connection distance between the touch pad 10 and the touch IC 30 is increased, and thus the spacing is increased from the first spacing S1 toward a fifth spacing S5 (S1<S2<S3<S4<S5).

FIG. 8 illustrates a touch screen panel according to a sixth embodiment of the present invention. Here, for a plurality of columns Col 1 to Col 5 in which the touch pads 10 are disposed, adjacent columns are disposed at a distance offset of about ½ of a total length of the touch pad 10 and connection patterns between the sensor signal lines of odd and even-numbered columns in a disposition order of a plurality of columns are differently formed.

That is, according to the touch screen panel according to the sixth embodiment of the present invention, connection shapes of the sensor signal lines 20 connected to a first column Col 1, a third column Col 3, and a fifth column Col 5 that are the odd-numbered columns are same, and therefore all the resistance compensation patterns 25 are same as the first resistance pattern 25-1.

Further, according to the touch screen panel according to the sixth embodiment of the present invention, connection shapes of the sensor signal lines 20 connected to a second column Col 2, a fourth column Col 4, and a sixth column Col 6 that are the even-numbered columns are same, and therefore all the resistance compensation patterns 25 are same as the second resistance pattern 25-2. However, the resistance compensation patterns 25 may be designed not to be same.

When the touch pads 10 are disposed at the distance offset of about ½, the distance from the touch IC 30 is changed depending on whether the column is an odd number or an even number. In particular, the touch pad 10 at the sixth row Row 6 positioned at the bottom of each column has an area of ½ of the touch pad 10 in the case of the odd-numbered columns but the touch pad 10 has a unitary area in the even-numbered columns, and therefore the resistance value is different in the odd and even-numbered columns. Therefore, according to the sixth embodiment of the present invention, the connection patterns between the sensor signal lines of the odd and even-numbered columns, that is, the resistance compensation patterns 25 are formed to be different from each other.

FIG. 9 illustrates a touch screen panel according to a seventh embodiment of the present invention, in which for the plurality of columns Col 1 to Col 5 disposed like the sixth embodiment, adjacent columns are disposed at a distance offset of about ½ of a total length of the touch pad 10 and according to the seventh embodiment of the present invention, the connection shapes of the resistance compensation patterns 25 are different according to the distance between the column and the touch IC 30.

That is, the third column Col 3 that is closest to the touch IC 30 is formed in the first resistance compensation pattern 25-1, the second column Col 2 and the fourth column Col at both sides of the third column Col 3 are formed in the second resistance compensation pattern 25-2, and the first column Col 1 and the fifth column Col 5 that are farthest from the touch IC 30 are formed in the third resistance compensation pattern 25-3.

According to the touch screen panel according to the fifth embodiment of the present invention, the connection distance to the touch IC 30 is same in the second column Col 2 to the fourth column Col 4, but the area of the touch pad 10 at the bottom of the third column Col 3 is smaller than that of the touch pad 10 at the bottom of the second column Col 2 to the fourth column Col 4 due to the offset, and therefore the resistance compensation pattern 25 is formed to be different.

As described above, in the touch screen panel according to the present invention, the resistance compensation pattern 25 is variously formed in consideration of the distance between the touch pad 10 and the touch IC 30, such that the resistance value of the sensor signal line 20 may be elaborately adjusted.

According to the sixth and seventh embodiments of the present invention, the disposition structure in which the distance offset of about ½ in the total length of the touch pad 10 is applied is formed, but the offset value is not limited thereto and therefore various offset values may be applied.

As described above, the touch screen panel according to the present invention includes the resistance compensation pattern compensating for the difference in the resistance values of the sensor signal lines that occurs according to the distance between the plurality of touch pads disposed in the matrix form and the touch IC, thereby preventing the touch pad from being damaged due to the electrostatic discharge (ESD) introduced from the outside of the touch screen panel or the overvoltage generated from the touch IC.

According to the present invention, the touch screen panel includes the resistance compensation pattern compensating for the low resistance value of the sensor signal lines connecting between the plurality of touch pads disposed in the matrix form and the touch IC, thereby preventing the touch pad from being damaged due to the electrostatic discharge (ESD) introduced into the touch screen panel or the overvoltage generated from the touch IC.

Further, the width of the sensor signal line is formed to be different according to the distance between the touch pad and the touch IC, thereby stably maintaining the resistance value of the sensor signal line.

Further, the resistance compensation pattern has the meander shape, thereby effectively increasing the length of the sensor signal line within the limited space.

Further, the resistance compensation pattern is formed in the internal region of the touch pad, and therefore the region in which the resistance compensation pattern is formed need not be separately secured in the touch screen panel region and the size of the touch pad need not be adjusted to form the resistance compensation pattern.

Hereinabove, the embodiments of the present invention are described but the technical idea of the present invention is not limited to the foregoing embodiments. Therefore, the touch screen panel may be variously implemented without departing from the scope of the present invention.

DETAILED DESCRIPTION OF MAIN ELEMENTS

1: Existing touch pad
2: Existing sensor signal line
3: Existing touch IC
10: Touch pad
15: Touch pattern
20: Sensor signal line
20-1 to 20-6: First sensor signal line to sixth sensor signal line
25: Resistance compensation pattern
251: Internal resistance compensation pattern
252: External resistance compensation pattern
25-1: First resistance compensation pattern
25-2: Second resistance compensation pattern
25-3: Third resistance compensation pattern
30: Touch IC
Col1 to Col5: First column to fifth column
Row1 to Row6: First row to sixth row

What is claimed is:

1. A capacitive touch screen panel sensing a generation of touch electrostatic capacity by an approach of a touch input means, including a finger or a touch by a touch input tool, the touch screen panel comprising:
a plurality of touch pads formed in a matrix having a plurality of rows and a plurality of columns configured to sense a touch capacitance (Ct) signal between the touch pad and the touch input means; and
a plurality of sensor signal lines connecting each of the plurality of touch pads to a touch integrated circuit (IC) for transmitting the sensed Ct signal changed on one of the plurality of touch pads to the touch IC,
wherein the sensor signal lines connected between each touch pad, positioned at a bottom of each column, and the touch IC are provided with resistance compensation patterns compensating for a resistance value according to a distance between the touch pad and the touch IC, and
the resistance compensation patterns include an internal resistance compensation pattern formed inside each touch pad and
an external resistance compensation pattern formed outside between each touch pad and the touch IC.

2. The touch screen panel of claim 1, wherein as the resistance value to be compensated based on a set value of the sensor signal line is increased, a length of the resistance compensation pattern becomes longer.

3. The touch screen panel of claim 1, wherein the plurality of sensor signal lines have a wiring width increased in proportion to a connection distance between the touch pad and the touch IC.

4. The touch screen panel of claim 3, wherein a spacing between the plurality of sensor signal lines is changed according to a wiring width of a sensor signal line having the wider wiring width of the two adjacent sensor signal lines.

5. The touch screen panel of claim 1, wherein an area of the touch pad is increased in proportion to a distance from the touch IC.

6. The touch screen panel of claim 1, wherein the plurality of sensor signal lines are formed so that lengths of adjacent resistance compensation patterns are different from each other according to the distance between the respective touch pads and the touch IC.

7. The touch screen panel of claim 1, wherein adjacent columns or adjacent rows are formed to intersect each other, having a predetermined offset.

8. The touch screen panel of claim 7, wherein a shape of resistance compensation patterns formed in odd-numbered columns and a shape of resistance compensation patterns formed in even-numbered columns in a disposition order of the plurality of columns are different from each other, and
a shape of resistance compensation patterns formed in odd-numbered rows and a shape of resistance compensation patterns formed in even-numbered rows in a disposition order of the plurality of rows are different from each other.

9. The touch screen panel of claim 1, wherein the resistance compensation pattern has a meander shape.

10. The touch screen panel of claim 1, wherein the resistance compensation pattern prevents electrostatic discharge (ESD) introduced into the touch screen panel or overvoltage generated from the touch IC.

11. The touch screen panel of claim 1, wherein the touchpad includes a touch pattern in a state in which diamond-shaped basic touch patterns are disposed in a row.

12. The touch screen panel of claim 11, wherein the touch pattern is formed by repeatedly patterning a transparent conductive material in a plurality of fine patterns.

13. The touch screen panel of claim 1, wherein the sensor signal line is formed by repeatedly patterning a transparent conductive material in a plurality of fine patterns.

14. The touch screen panel of claim 13, wherein the transparent conductive material is any one of ITO, CNT, ATO, and IZO.

* * * * *